(12) United States Patent
Samaranayake

(10) Patent No.: US 6,743,514 B1
(45) Date of Patent: Jun. 1, 2004

(54) RADIATION-CURABLE COATING FOR INK JET PRINTING

(75) Inventor: Gamini S. Samaranayake, Mount Pleasant, SC (US)

(73) Assignee: MeadWestvaco Corporation, Stamford, CT (US)

( * ) Notice: Subject to any disclaimer, the term of this patent is extended or adjusted under 35 U.S.C. 154(b) by 223 days.

(21) Appl. No.: 10/099,670

(22) Filed: Mar. 15, 2002

(51) Int. Cl.[7] .............................................. B23B 17/10
(52) U.S. Cl. .................... 428/441; 428/461; 428/475.8; 428/483; 428/500; 428/511; 428/514; 522/81; 522/83; 522/84; 522/85; 524/800; 524/802; 524/815; 524/832; 524/833; 524/836
(58) Field of Search .............................. 522/83, 84, 81, 522/85; 524/800, 802, 815, 832, 833, 836; 428/441, 461, 475.8, 483, 500, 511, 514

(56) References Cited

U.S. PATENT DOCUMENTS

| | | |
|---|---|---|
| 4,100,045 A | 7/1978 | Bogan et al. |
| 4,380,601 A * | 4/1983 | Welsh et al. ................. 524/555 |
| 4,460,637 A | 7/1984 | Miyamoto et al. |
| 4,542,088 A * | 9/1985 | Kojima et al. ............ 430/273.1 |
| 4,636,805 A | 1/1987 | Toganoh et al. |
| 5,242,955 A | 9/1993 | Harano et al. |
| 5,304,628 A | 4/1994 | Kinoshita et al. |
| 5,372,884 A | 12/1994 | Abe et al. |
| 5,468,786 A | 11/1995 | Bayer et al. |
| 5,478,631 A | 12/1995 | Kawano et al. |
| 5,712,027 A | 1/1998 | Ali et al. |
| 5,830,927 A * | 11/1998 | Vanderhoff et al. ........... 522/81 |
| 5,847,022 A | 12/1998 | Yamashina et al. |
| 5,922,398 A * | 7/1999 | Hermes et al. ............. 427/137 |
| 6,010,790 A | 1/2000 | Chen et al. |

FOREIGN PATENT DOCUMENTS

| | | |
|---|---|---|
| EP | 0738608 | 4/1996 |
| EP | 1006161 | 6/1999 |
| WO | WO9942296 | 8/1999 |

\* cited by examiner

*Primary Examiner*—Susan W. Berman
(74) *Attorney, Agent, or Firm*—Daniel B. Reece, IV; Terry B. McDaniel

(57) ABSTRACT

This invention pertains to radiation-curable aqueous compositions comprising a mixture of water-reducible oligomer, monomer, and water-insoluble cationically-modified latex. More particularly, the invention pertains to radiation-curable aqueous compositions that are suitable for use as ink jet printing receptive coatings and in the production of ink jet printable products.

17 Claims, No Drawings

RADIATION-CURABLE COATING FOR INK JET PRINTING

FIELD OF INVENTION

This invention pertains to radiation-curable aqueous compositions comprising a mixture of monomer, water-reducible oligomer, and water-insoluble cationically-modified latex. More particularly, the invention pertains to radiation-curable aqueous compositions that are suitable for use as ink jet printing receptive coatings and in the production of ink jet printable products.

BACKGROUND OF THE INVENTION

Ink jet printing is widely used to print on a variety of substrates (including paper, textiles, and plastic films). These substrates are often coated with a material that enhances their receptivity for the ink jet ink. In the case of aqueous dye-based inks, which comprise the majority of inks currently used in ink jet printing, two properties are of paramount importance. The first is an affinity for water, as the coating must absorb a large amount of water from the ink in order to obtain a print that is dry to the touch in few seconds. Inkjet ink formulations often contain over 90% water. Furthermore, the coating must maintain its physical integrity while absorbing all of this water. In other words, the receptive coating must be hydrophilic enough to absorb a large quantity of water without actually being water-soluble.

The second important property is dye fixation. The majority of aqueous inkjet inks are based on dyes rather than pigments. To obtain sharp prints with high color density, the dye molecules must be immobilized almost immediately upon contact of the ink with the substrate. Penetration of the dyes into the substrate will result in reduced color density, while lateral migration of the dye molecules will cause indistinctness in the image formed.

In order to obtain high water absorption, inkjet receptive coatings are traditionally formulated with both hydrophilic pigments (such as silica or alumina) and hydrophilic binders. While the most commonly used hydrophilic binders are polyvinyl alcohol (PVOH) and polyvinylpyrrolidinone (PVP), other suitable natural and synthetic polymers are known in the art (e.g., gelatin, starch, polyethylene oxide (PEO), hydroxyethylcellulose, carboxymethylcellulose, and the like). Those polymers that contain hydroxyl groups (such as starch, PVOH, and PEO) are often cross-linked with a compound such as glyoxal or glutaraldehyde to render them water-insoluble while maintaining their hydrophilicity.

The dyes that are commonly employed in aqueous inkjet inks are anionic, containing sulfonic acid groups. Thus dye fixation is usually accomplished by the employment of cationic polymers, although some highly polar nonionic polymers (such as PVP and polyethyloxazoline) have a limited amount of dye fixing capability. A water-absorbing material and a cationic polymeric mordant are employed in typical constructions of ink jet coatings.

The most widely used cationic dye fixative in ink jet receptive coatings is poly(diallyldimethylammonium chloride), although other water-soluble cationic polymers are known in the art. For example, U.S. Pat. No. 6,010,790 to Chen et al. teaches the use of poly(vinylbennylquaternary ammonium salts). Other examples of water-soluble cationic polymers are cationic starch, cationic polyvinyl alcohol, guanidine-formaldehyde resins, epichlorohydrin-polyamine condensates, and water-soluble cationic acrylic resins.

However, a problem exists with the use of both soluble dipolar polymers and soluble cationic polymers in that, unless these polymers are cross-linked in some way, their presence has a detrimental effect on the water resistance of the ink jet prints.

Radiation curing provides an alternative method of producing a crosslinked coating. Desired coating characteristics can be obtained by incorporating appropriate monomers into the coating formulation.

Radiation-curable resins undergo crosslinking reactions when exposed suitable radiation, including ultraviolet (UV), electron beam, and other known radiations. Both free radical addition polymerization of vinyl compounds and cationic addition polymerization of epoxides and of vinyl ethers are amenable to radiation curing.

UV-curable formulations are essentially a mixture of low molecular weight reactive pre-polymers and monomers that also act as diluents. For free radical polymerizations, pre-polymers can be selected from commercially available acrylates of polyester, polyurethane, and polyether or polyepoxide. Alternatively, cationically curable systems are formulated with vinyl ethers or polyepoxides. These two curing systems require different initiators: the first, a radical generator; and the second, a photoacid that generates protons on irradiation.

Conventional radiation-curable coatings are often formulated for use as protective coatings. Such coatings are highly hydrophobic, crosslinked coatings designed to be impervious to liquids and to resist staining and abrasion. In contrast, an ink jet receptive coating should be hydrophilic in nature in order to be absorptive and susceptible to staining with inks. As noted above, ink jet inks (which are typically dilute aqueous solutions of dyes) demand coatings that can handle a high fluid load. Therefore, it is desirable that inkjet receptive coatings be able to fix water-soluble dyes so that prints are rendered water-insoluble.

Radiation-curable inks have also been employed to print on largely nonporous substrates for display graphics and other purposes. Improved adhesion, abrasion resistance, waterfastness, and gloss characteristics are some of the advantages of this technology.

Certain methods of making curable, multifunctional pre-polymers, and their use in microporous and/or semi-interpenetrating network forms have been described. For example, PCT International Publication No. WO 99/42296 describes an ink jet coating that is composed of a semi-interpenetrating network of hydrophilic/hydrophobic polymers. The hydrophobic part, a conventional curable mixture of monomer/oligomer/initiator, and the hydrophilic part, a water-soluble polymer dissolved in it, complete an interpenetrating network upon curing. The cationic, water-soluble component functions as the ink-receptive element. These formulations have the disadvantage of having to use volatile monomers, although they eventually are rendered nonvolatile after curing. In the technology described, the monomers are essential for viscosity control and as solvent carriers for the ink-receptive polyvinylpyrollidinone/polyvinyl acetate copolymer. European Patent Application No. 0738608A2 describes curable polymeric materials suitable for ink jet coatings and ink formulations composed of water-soluble cationic polymers with a pre-polymer/monomer mixture. However, these formulations are made homogeneous by using water-soluble organic solvents. In both of these technologies, the use of water-soluble polymers compromises waterfastness unless they are high molecular weight materials. The high viscosity of these formulations requires use of a co-solvent or monomer as a diluent.

Therefore, an object of this invention is to disclose radiation-curable, aqueous compositions.

Another object of this invention is to disclose radiation-curable, aqueous compositions that exhibit properties that allow them to be useful in producing ink jet printing coating formulations.

A further object of this invention is to disclose radiation-curable ink jet printing coatings.

Yet another object of this invention is to disclose ink jet printable products.

SUMMARY OF THE INVENTION

The objects of this invention are met by the use of radiation-curable aqueous compositions comprising a mixture of water-reducible oligomer, monomer, and water-insoluble cationically-modified latex. Upon curing, the oligomer component and the monomer component of the mixture react in a free radical polymerization reaction to produce a continuous matrix that embeds the discontinuous phase formed by the water-insoluble cationically-modified latex particles. While these latex particles are not water-soluble, they are sufficiently hydrophilic to function as water-dissipating elements. Thus the utilization of a cationically charged, hydrophilic, continuous phase results, upon curing, in an ink jet receptive coating that wets easily with aqueous ink, has good compatibility with the cationic latex particles, and imparts excellent ink receptivity.

DESCRIPTION OF THE PREFERRED EMBODIMENT

The radiation-curable aqueous compositions of the present invention comprise mixtures of:

(A) about 10.0% to about 60.0% by total weight of the mixture of a member selected from the group consisting of water-reducible oligomers having a weight average molecular weight in the range of about 180 to about 3,000 which contain at least two acrylate groups, and combinations thereof;

(B) about 10.0% to about 50.0% by total weight of the mixture of a member selected from the group consisting of monomers containing at least one ethylenically unsaturated group and at least one quaternary amine group, and combinations thereof; and wherein said monomer is capable of reacting in a radiation-induced free radical polymerization reaction with said oligomer (A);

(C) about 1.0% to about 20.0% by total weight of the mixture of a member selected from the group consisting of water-insoluble cationically-modified acrylic latexes having a glass transition temperature in the range of about 40° C. to about 110° C., water-insoluble cationically-modified styrenic latexes having a glass transition temperature in the range of about 40° C. to about 110° C., and combinations thereof;

(D) up to about 2.0% by total weight of the mixture of a surfactant; and (E) the balance of the mixture being water, to produce radiation-curable aqueous compositions having a solids content in the range of about 35.0% to about 97.0%.

Preferred radiation-curable aqueous compositions comprise mixtures of:

(A) about 30.0% to about 50.0% by total weight of the mixture of a member selected from the group consisting of water-reducible oligomers having a weight average molecular weight in the range of about 180 to about 3,000 which contain at least two acrylate groups, and combinations thereof;

(B) about 20.0% to about 42.0% by total weight of the mixture of a member selected from the group consisting of monomers containing at least one ethylenically unsaturated group and at least one quaternary amine group, and combinations thereof; and wherein said monomer is capable of reacting in a radiation-induced free radical polymerization reaction with said oligomer (A);

(C) about 5.0% to about 12.0% by total weight of the mixture of a member selected from the group consisting of water-insoluble cationically-modified acrylic latexes having a glass transition temperature in the range of about 40° C. to about 110° C., water-insoluble cationically-modified styrenic latexes having a glass transition temperature in the range of about 40° C. to about 110° C., and combinations thereof;

(D) up to about 2.0% by total weight of the mixture of a surfactant; and (E) the balance of the mixture being water; to produce radiation-curable aqueous compositions having a solids content in the range of bout 35.0% to about 97.0%.

Oligomers that are suitable for use in the present invention contain at least two acrylate groups, are water-reducible (i.e., dilution with water does not produce a non-homogenous mixture), and have a weight average molecular weight in the range of about 180 to about 3,000 (preferably in the range of about 300 to about 1,500). Suitable oligomers include, but are not limited to, the following: acrylates of aromatic polyesters, acrylates of aliphatic polyesters, acrylates of aromatic and aliphatic polyesters, acrylates of aromatic polyurethanes, acrylates of aliphatic polyurethanes, acrylates of aromatic and aliphatic polyurethanes, acrylates of aromatic polyethers, acrylates of aliphatic polyethers, acrylates of aromatic and aliphatic polyethers, acrylates of aromatic polyepoxides, acrylates of aliphatic polyepoxides, acrylates of aromatic and aliphatic polyepoxides, and combinations thereof. It is preferred that the oligomer be a member selected from the group consisting of alkylepoxy acrylates, arylepoxy acrylates, and combinations thereof.

Monomers that are suitable for use in the present invention contain at least one ethylenically unsaturated group and at least one quaternary amine group. It is preferred that the monomers contain only one ethylenically unsaturated group.

Suitable monomers include, but are not limited to, the following: diallyldimethylammonium salts, quaternized alkyl salts of dialkylaminoalkyl acrylates, quaternized vinyl imidazoles, quaternized vinyl morpholines, quaternized alkyl salts of dialkylaminoalkyl acrylamides, quaternized alkyl salts of dialkylaninoallyl methacrylamides, and combinations thereof. It is preferred that the monomer is a member selected from the group consisting of quaternized alkyl salts of dimethylaminoethyl acrylates, quaternized alkyl salts of dimethylaminoethyl methacrylates, and combinations thereof It is also preferred that the salts be derivatives of alkyl sulfates, chlorides, halides, sulfates, nitrates, unsaturated carboxylic acids, or saturated carboxylic acids; with chloride-salt derivatives being more preferred.

Oligomers and monomers that are suitable for use in the present invention must be capable, upon irradiation, of undergoing a radiation-induced free radical polymerization reaction. Upon exposure to suitable radiation, the oligomer and the monomer component of the mixture react in a free radical polymerization reaction to produce a crosslinked continuous matrix that embeds the discontinuous phase formed by latex particles.

Curing may be done by any common method of irradiation, including ultraviolet (UV) and electron beam. Where UV-curing is desired, a photoinitiator or combination of photoinitiators may be incorporated into the aqueous composition. Any photoinitator commonly employed in the UV-curing of printing coatings may be utilized, including commercially available benzophenones and benzil ketal derivatives. A preferred photoinitiator is water-soluble (4-hydroxyethylbenzyloxy)-1-hydroxycyclohexane.

Cationically-modified latexes employed in the present invention are water-insoluble and should have a high enough glass transition temperature (Tg) to slow inter-diffusion of latex particles, thereby avoiding film formation by coalescence at ambient temperatures. Latexes suitable for use in the present invention include water-insoluble cationically-modified acrylic latexes, water-insoluble cationically-modified styrenic latexes, and combinations thereof; wherein the latexes have a glass transition temperature in the range of about 40° C. to about 110° C. It is preferred that the latex have a Tg in the range of about 50° C. to about 90° C.; more preferably in the range of about 70° C. to about 80° C.

Commercially available water-insoluble cationically-modified acrylic latexes may be utilized in the present invention. Where desired, suitable water-insoluble cationically-modified acrylic latexes can be prepared employing standard emulsion polymerization techniques using combinations of: 1) alkyl(meth)acrylates, aryl(meth)acrylates, substituted alkyl(meth)acrylates bearing oxygen or nitrogen functional groups, alkyl(meth)acrylamides, substituted alkyl (meth)acrylamides bearing oxygen or nitrogen functional groups, styrenes, substituted styrenes, and the like; 2) dialkylaminoalkyl(meth)acrylates, dialkylaminoalkyl(meth)acrylamides, N-vinylpyrrolidones, vinyl imidazoles, vinyl morpholines, and the like; and 3) diallyldimethylammonium salts, quaternized alkyl salts of dialkylaminoalkyl acrylates, quaternized vinyl imidazoles, quaternized vinyl morpholines, quaternized alkyl salts of dialkylaminoalkyl acrylamides, quaternized alkyl salts of dialkylaminoallyl methacrylamides, and the like. It is within the ability of a skilled artisan to produce water-insoluble cationically-modified acrylic latexes using the teachings contained herein.

Where desired, a surfactant or combination of surfactants may be added to the aqueous composition as a wetting agent, to adjust surface tension, or for other purposes. It is within the ability of one skilled in the art to employ a proper surfactant depending upon desired use and the substrate to be coated. Commercially available surfactants may be utilized, including radiation-curable surfactants. Surfactants suitable for use in the emulsion polymerization reaction include members selected from the group consisting of nonionic surfactants, cationic surfactants, and combinations thereof. Preferred nonionic surfactants include ethoxylated alkylphenols, ethoxylated fatty alcohols, ethylene oxide/propylene oxide block copolymers, fluoroalkyl ethers, and the like. Preferred cationic surfactants include, but are not limited to, the following: alkyltrimethylammonium salts wherein the alkyl group contains from 8 to 22 (preferably 12 to 18) carbon atoms; alkylbenzyldimethylammonium salts wherein the alkyl group contains from 8 to 22 (preferably 12 to 18) carbon atoms, and ethylsulfate; and alkylpyridinium salts wherein the alkyl group contains from 8 to 22 (preferably 12 to 18) carbon atoms.

Sufficient water is added to the mixture produce a radiation-curable aqueous composition having a solids content in the range of about 35.0% to about 97.0%. The preferred solids content for the composition is in the range of about 40.0% to about 72.0%.

The aqueous compositions of the present invention may be employed as ink jet receptive coatings. When utilized as ink jet receptive coatings, it is preferred that the coatings have a pH in the range of about 4.0 to about 8.0, with the more preferred range being about 5.5 to about 7.3. Such ink jet receptive coatings can be employed to produce ink jet printable products via the process of coating a chosen substrate on at least one side with a desired thickness of the inkjet receptive coating, then curing the coating via irradiation. Substrates which are suitable for use in producing such ink jet printable products include paper, paperboard, wood, plastic film, metal foil, metallized film, composite materials, glass, textiles, and the like. Where desired, the radiation-curable ink jet coating may be applied to coatings that are affixed to such substrates.

Where desired, any compatible pigment or combination of pigments traditionally used in ink jet receptive coatings may be employed in the coating. Such pigments include, but are not limited to, the following: silica, alumina, plastic pigments, calciun carbonate, kaolin clay, and combinations thereof.

An advantage of the present invention is that the relatively low viscosity of the radiation-curable, aqueous composition permits the preparation and utilization of ink jet receptive coatings without the need to use organic solvents and/or volatile monomers as diluents. However, where desired, non-volatile organic solvents that will not dissolve the water-insoluble cationically-modified latexes may be incorporated into the ink jet receptive coatings in order to solubilize additional additives. Suitable solvents include, but are not limited to, the following: alcohols, methylethylketones, methylpyrrolidone, and combinations thereof.

As appreciated in the art, the exact components and properties of components desired for any coating application can vary and, therefore, routine experimentation may be required to determine the optional components and proportions of components for a given application and desired properties.

The following examples are provided to further illustrate the present invention and are not to be construed as limiting the invention in any manner.

EXAMPLE 1

A 500 ml. beaker fitted with an overhead stirrer was charged with 26 parts by weight of methacryloyloxyethyl-trimethylammonium chloride (METAC). An additional charge of 53 parts of Laromer 8982 (a multifunctional oligomer available from BASF Corporation) was added with stirring to the beaker over a period of 15 minutes. Subsequently, a charge of 21 parts of TRUDOT™ P-2605 (a water-insoluble cationically-modified acrylate latex available from Westvaco Corporation) was added with stirring to the beaker over a period of 15 minutes, after which a charge of 0.3 part of TINUVIN® 2959 (an ultraviolet radical initiator available from Ciba) was added. The resulting composition had a solids level of 72.6% and a pH level of 6.8.

The solids level of the composition was adjusted to 60% by weight with deionized water to produce an ultraviolet (UV) curable coating solution. The solution was drawn down with a #10 wire-wound rod onto sheets of base coated paper. The paper sheets were placed separately on the conveyer of a 6-inch Fusion Systems V-curer (which was set at a speed of 18 feet per minute) and irradiated to cure the coating. Test prints were made on the coated paper sheets with black ink using a HP 592 ink jet ink printer. The coating exhibited good gloss and print receptive properties.

EXAMPLE 2

A 500 ml. beaker fitted with an overhead stirrer was charged with 42 parts by weight of METAC. An additional charge of 42 parts of Laromer 8982 (a multifunctional oligomer available from BASF Corporation) was added with stirring to the beaker over a period of 15 minutes. Subsequently, a charge of 17 parts of TRUDOT™ P-2605 (a water-insoluble cationically-modified acrylate latex available from Westvaco Corporation) was added with stirring to the beaker over a period of 15 minutes, after which a charge of 0.3 part of TINUVIN® 2959 (an ultraviolet radical initiator available from Ciba) was added. The resulting composition had a solids level of 71% and a pH level of 7.0.

The solids level of the composition was adjusted to 60% by weight with deionized water to produce an UV-curable coating solution. The coating solution was drawn down with a #9 wire-wound rod onto sheets of base coated paper. The paper sheets were placed separately on the conveyer of a 6-inch Fusion Systems UV-curer (which was set at a speed of 18 feet per minute) and irradiated. Test prints were made on the coated paper sheets with black ink using a HP 592 ink jet ink printer. The coating exhibited good gloss and print receptive properties.

EXAMPLE 3

A 500 ml. beaker fitted with an overhead stirrer was charged with 42 parts by weight of METAC. An additional charge of 42 parts of Laromer 8982 (a multifunctional oligomer available from BASF Corporation) was added with stirring to the beaker over a period of 15 minutes. Subsequently, a charge of 17 parts of TRUDOT™ P-2603 (a water-insoluble cationically modified acrylate latex available from Westvaco Corporation) was added with stirring to the beaker over a period of 15 minutes, after which a charge of 0.3 part of TINUVIN® 2959 (an ultraviolet radical initiator available from Ciba) was added. The resulting composition had a solids level of 73% and a pH level of 7.3.

The solids level of the composition was adjusted to 60% by weight with deionized water to produce an UV-curable coating solution. The solution was drawn down with a #9 wire-wound rod onto sheets of base coated paper. The paper sheets were placed separately on the conveyer of a 6-inch Fusion Systems UV curer (which was set at a speed of 18 feet per minute) and irradiated. Test prints were made on the coated paper sheets with black ink using a HP 592 ink jet ink printer. The coating exhibited a gloss value of 45 at 60° and excellent ink receptive properties.

EXAMPLE 4

The UV-curable coating solution of Example 3 was drawn down with a #9 wire-wound rod onto sheets of clay coated paper. The paper sheets were placed separately on the conveyer of a 6-inch Fusion Systems UV curer (which was set at a speed of 18 feet per minute) and irradiated. Test prints were made on the coated paper sheets with black ink using a HP 592 ink jet ink printer. The coating exhibited a gloss value of 77 at 60° and excellent print receptive properties.

EXAMPLE 5

A 500 ml. beaker fitted with an overhead stirrer was charged with 42 parts by weight of METAC. An additional charge of 42 parts of Laromer 8982 (a multifunctional oligomer available from BASF Corporation) was added with stirring to the beaker over a period of 15 minutes. Subsequently, a charge of 17 parts of TRUDOT™ P-2603 (a water-insoluble cationically-modified acrylate latex available from Westvaco Corporation) was added with stirring to the beaker over a period of 15 minutes, after which a charge of 0.3 part of TINUVIN® 2959 (an ultraviolet radical initiator available from Ciba) was added. The resulting composition had a solids level of 73% and a pH level of 7.3.

To the composition was added 0.3% by weight of FLUO-RAD® 129 (a surfactant from 3-M Corporation) to produce a UV-curable coating solution. The solution was drawn down with a #9 wire-wound rod onto sheets of vinyl film. The coated film sheets were placed on the conveyer of a 6-inch Fusion Systems UV curer (which was set at a speed of 18 feet per minute) and irradiated. Test prints were made on the coated film sheets using a HP 592 ink jet ink printer. The coating exhibited a gloss value of 77 at 60° and good ink receptive properties.

EXAMPLE 6

For comparison purposes, in this example a cationic water-soluble polymer was For substituted for the cationic water-insoluble latex.

A 500 ml. beaker fitted with an overhead stirrer was charged with 35 parts by weight of METAC. An additional charge of 54 parts of Gafquat (a cationic water-soluble polymer available from International Specialty Products) was added with stirring to the beaker over a period of 15 minutes. Subsequently, an additional charge of 11 parts of Laromer 8982 (a multifunctional oligomer available from BASF Corporation) was added with stirring to the beaker over a period of 15 minutes, after which a charge of 0.3 part of TINUVIN® 2959 (an ultraviolet radical initiator available from Ciba) was added. The resulting composition had a solids level of 35% and a pH level of 7.0.

The UV-curable coating composition was drawn down with a #10 wire-wound rod onto sheets of base coated paper. The coated paper sheets were placed separately on the conveyer of a 6-inch Fusion Systems UV-curer (which was set at a speed of 18 feet per minute) and irradiated. Test prints were made on the coated paper sheets with black ink using a HP 592 ink jet ink printer. Poor absorption of the ink by the coated paper resulted in ink crawl.

EXAMPLE 7

For comparison purposes, in this example a cationic water-soluble polymer was substituted for the cationic water-insoluble latex.

A 500 ml. beaker fitted with an overhead stirrer was charged with 45 parts by weight of METAC. An additional charge of 45 parts of Gafquat (a cationic water-soluble polymer available from International Specialty Products) was added with stirring to the beaker over a period of 15 minutes. Subsequently, an additional charge of 9 parts of Laromier 8765 (a multifunctional oligomer available from BASF Corporation) was added with stirring to the beaker over a period of 15 minutes, after which a charge of 0.3 part of TINUVIN® 2959 (an ultraviolet radical initiator available from Ciba) was added. The resulting composition had a solids level of 35% and a pH level of 7.0.

The UV-curable coating composition was drawn down with a #9 wire-wound rod onto sheets of base coated paper. The coated paper sheets were placed separately on the conveyer of a 6-inch Fusion Systems UV-curer (which was set at a speed of 18 feet per minute) and irradiated. Test prints were made on the coated paper sheets with black ink using a HP 592 ink jet ink printer. Poor absorption of the ink by the coated paper resulted in ink crawl, while poor dye fixation yielded unacceptable water-fastness.

EXAMPLE 8

For comparison purposes, in this example a cationic water-soluble polymer and non-ionic multifunctional acrylates were substituted for the cationic water-insoluble latex.

A 500 ml. beaker fitted with an overhead stirrer was charged with 20 parts by weight of METAC. An additional charge of 17.8 parts of Laromer 8765 (a multifunctional oligomer available from BASF Corporation) was added with stirring to the beaker over a period of 15 minutes. Then charges of 17.8 parts of SR 415 (a PEG trimethyolotriacrylate available from Sartomer) and 17.8 parts of SR 344 (a PEG diacrylate available from Sartomer) were added. Subsequently, a charge of 0.3 part of TINUVIN® 2959 (an ultraviolet radical initiator available from Ciba) was added with stirring to the mixture. The resulting composition had a water content of about 7% and a pH level of 7.3.

This UV-curable coating composition was drawn down with a #9 wire-wound rod onto sheets of base coated paper. The paper sheets were placed separately on the conveyer of a 6-inch Fusion Systems UV-curer (which was set at a speed of 18 feet per minute) and irradiated. Test prints were made on the coated paper sheets with black ink using a HP 592 ink jet ink printer. Poor coating laydown resulted in pitting and poor dye fixation yielded bleeding of the ink.

Many modifications and variations of the present invention will be apparent to one of ordinary skill in the art in light of the above teachings. It is therefore understood that the scope of the invention is not to be limited by the foregoing description, but rather is to be defined by the claims appended hereto.

What is claimed is:

1. A radiation-curable, aqueous composition comprising a mixture of:
    (A) about 10.0% to about 60.0% by total weight of the mixture of a member selected from the group consisting of water-reducible oligomers having a weight average molecular weight in the range of about 180 to about 3,000 which contain at least two acrylate groups, and combinations thereof;
    (B) about 10.0% to about 50.0% by total weight of the mixture of a member selected from the group consisting of monomers containing at least one ethylenically unsaturated group and at least one quaternary amine group, and combinations thereof; and wherein said monomer is capable of reacting in a radiation-induced free radical polymerization reaction with said oligomer (A);
    (C) about 1.0% to about 20.0% by total weight of the mixture of a member selected from the group consisting of water-insoluble cationically-modified acrylic latexes having a glass transition temperature in the range of about 40° C. to about 110° C., water-insoluble cationically-modified styrenic latexes having a glass transition temperature in the range of about 40° C. to about 110° C., and combinations thereof;
    (D) up to about 2.0% by total weight of the mixture of a surfactant; and
    (E) the balance of the mixture being water; to produce a radiation-curable aqueous composition having a solids content in the range of about 35.0% to about 97.0%.

2. The radiation-curable, aqueous composition of claim 1 wherein:
    (A) about 30.0% to about 50.0% by total weight of the mixture of a member selected from the group consisting of water-reducible oligomers having a weight average molecular weight in the range of about 180 to about 3,000 which contain at least two acrylate groups, and combinations thereof;
    (B) about 20.0% to about 42.0% by total weight of the mixture of a member selected from the group consisting of monomers containing at least one ethylenically unsaturated group and at least one quaternary amine group, and combinations thereof; and wherein said monomer is capable of reacting in a radiation-induced free radical polymerization reaction with said oligomer (A);
    (C) about 5.0% to about 12.0% by total weight of the mixture of a member selected from the group consisting of water-insoluble cationically-modified acrylic latexes having a glass transition temperature in the range of about 40° C. to about 110° C., water-insoluble cationically-modified styrenic latexes having a glass transition temperature in the range of about 40° C. to about 100° C., and combinations thereof;
    (D) up to about 2.0% by total weight of the mixture of a surfactant; and
    (E) the balance of the mixture being water; to produce a radiation-curable aqueous composition having a solids content in the range of about 35.0% to about 97.0%.

3. The radiation-curable aqueous composition of claim 1 wherein the oligomer has a weight average molecular weight in the range of about 300 to about 1,500.

4. The radiation-curable aqueous composition of claim 1 wherein the oligomer is a member selected from the group consisting of acrylates of aromatic polyesters, acrylates of aliphatic polyesters, acrylates of aromatic and aliphatic polyesters, acrylates of aromatic polyurethanes, acrylates of aliphatic polyurethanes, acrylates of aromatic and aliphatic polyurethanes, acrylates of aromatic polyethers, acrylates of aliphatic polyethers, acrylates of aromatic and aliphatic polyethers, acrylates of aromatic polyepoxides, acrylates of aliphatic polyepoxides, acrylates of aromatic and aliphatic polyepoxides, and combinations thereof.

5. The radiation-curable aqueous composition of claim 4 wherein the oligomer is a member selected from the group consisting of alkylepoxy acrylates, arylepoxy acrylates, and combinations thereof.

6. The radiation-curable aqueous composition of claim 1 wherein the monomer is a member selected from the group consisting of diallyldimethylammonium salts, quaternized alkyl salts of dialkylaminoalkyl acrylates, quaternized vinyl imidazoles, quaternized vinyl morpholines, quaternized alkyl salts of dialkylaminoalkyl acrylamides, quaternized alkyl salts of dialkylaminoallyl methacrylamides, and combinations thereof.

7. The radiation-curable aqueous composition of claim 6 wherein the monomer is a member selected from the group consisting of quaternized alkyl salts of dimethylaminoethyl acrylates, quaternized alkyl salts of dimethylaminoethyl methacrylates, and combinations thereof.

8. The radiation-curable aqueous composition of claim 1 wherein the latex has a glass transition temperature in the range of about 50° C. to about 90° C.

9. The radiation-curable aqueous composition of claim 1 wherein the latex has a glass transition temperature in the range of about 70° C. to about 80° C.

10. The radiation-curable aqueous composition of claim 1 wherein the surfactant is a member selected from the group consisting of nonionic surfactants, cationic surfactants, and combinations thereof.

11. The radiation-curable aqueous composition of claim 1 having a solids content in the range of about 40.0% to about 72.0%.

12. The radiation-curable aqueous composition of claim 1 with a suitable photoinitiator for ultraviolet curing contained therein.

13. An ink jet receptive coating comprising the radiation cured aqueous composition of claim 1.

14. The ink jet receptive coating of claim 13 wherein the coating further comprises a pigment.

15. The ink jet receptive coating of claim 14 wherein the pigment is a member selected from the group consisting of silica, alumina, plastic pigments, calcium carbonate, kaolin clay, and combinations thereof.

16. An ink jet printable product comprising a substrate coated on at least one side with the coating of claim 13 and wherein said coating is radiation-cured.

17. The ink jet printable product of claim 16 where the substrate is a member selected from a the group consisting of paper, paperboard, wood, plastic film, metal foil, metallized film, glass, extiles, and combinations thereof.

* * * * *